United States Patent
Parkinson et al.

(10) Patent No.: US 10,209,955 B2
(45) Date of Patent: Feb. 19, 2019

(54) AUTOMATIC SPEECH RECOGNITION (ASR) FEEDBACK FOR HEAD MOUNTED DISPLAYS (HMD)

(71) Applicant: Kopin Corporation, Westborough, MA (US)

(72) Inventors: Christopher Parkinson, Richland, WA (US); James Woodall, West Bridgford (GB)

(73) Assignee: Kopin Corporation, Westborough, MA (US)

( * ) Notice: Subject to any disclaimer, the term of this patent is extended or adjusted under 35 U.S.C. 154(b) by 133 days.

(21) Appl. No.: 14/540,943

(22) Filed: Nov. 13, 2014

(65) Prior Publication Data

US 2015/0142440 A1  May 21, 2015

Related U.S. Application Data

(60) Provisional application No. 61/905,130, filed on Nov. 15, 2013.

(51) Int. Cl.

| | |
|---|---|
| *G10L 15/00* | (2013.01) |
| *G06F 3/16* | (2006.01) |
| *G10L 15/22* | (2006.01) |
| *G10L 17/22* | (2013.01) |
| *G10L 17/00* | (2013.01) |

(52) U.S. Cl.
CPC ............ *G06F 3/167* (2013.01); *G10L 15/22* (2013.01); *G10L 17/22* (2013.01); *G10L 2015/225* (2013.01)

(58) Field of Classification Search
CPC ......... G06F 3/167; G10L 15/22; G10L 17/22; G10L 2015/225

USPC ......................................................... 704/249
See application file for complete search history.

(56) References Cited

U.S. PATENT DOCUMENTS

| | | | |
|---|---|---|---|
| 4,836,670 | A | 6/1989 | Hutchinson |
| 5,633,993 | A | 5/1997 | Redmann |
| 5,999,895 | A | 12/1999 | Forest |
| 6,084,556 | A | 7/2000 | Zwern |
| 6,100,871 | A | 8/2000 | Min |
| 6,124,843 | A | 9/2000 | Kodama |

(Continued)

FOREIGN PATENT DOCUMENTS

| | | |
|---|---|---|
| EP | 2 098 947 | 9/2009 |
| WO | WO 2015/073869 | 5/2015 |

(Continued)

OTHER PUBLICATIONS

International Search Report and Written Opinion of PCT/US2014/065771 entitled "Automatic Speech Recognition (ASR) Feedback for Head Mounted Displays (HMD)" dated Feb. 5, 2015.

(Continued)

*Primary Examiner* — Thierry L Pham
(74) *Attorney, Agent, or Firm* — Hamilton, Brook, Smith & Reynolds, P.C.

(57) ABSTRACT

Feedback mechanisms to the user of a Head Mounted Display (HMD) are provided. It is important to provide feedback to the user when speech is recognized as soon as possible after the user utters a voice command. The HMD displays and/or audibly renders an ASR acknowledgment in a manner that ensures the user that the HMD has received/understood his voiced command.

16 Claims, 6 Drawing Sheets

(56) References Cited

U.S. PATENT DOCUMENTS

| | | |
|---|---|---|
| 6,131,864 A | 10/2000 | Schumann |
| 6,278,975 B1 | 8/2001 | Brant et al. |
| 7,403,898 B2 | 7/2008 | Slemmer |
| 7,489,297 B2 | 2/2009 | Hohmann |
| 8,643,951 B1 | 2/2014 | Wheeler |
| 8,745,058 B1 | 6/2014 | Garcia-Barrio |
| 8,830,165 B1 | 9/2014 | Heath |
| 8,929,954 B2 | 1/2015 | Jacobsen |
| 9,122,307 B2 | 9/2015 | Jacobsen |
| 9,141,197 B2 | 9/2015 | MacDougall |
| 9,235,272 B1 | 1/2016 | Brooks-Heath |
| 9,311,718 B2 | 4/2016 | Scavezze |
| 9,383,816 B2 | 7/2016 | Hennelly |
| 9,500,867 B2 | 11/2016 | Parkinson |
| 9,904,360 B2 | 2/2018 | Hennelly |
| 2006/0041433 A1 | 2/2006 | Simmer et al. |
| 2006/0256083 A1 | 11/2006 | Rosenberg |
| 2008/0114603 A1 | 5/2008 | Desrochers |
| 2008/0316212 A1 | 12/2008 | Kushler |
| 2009/0002325 A1* | 1/2009 | Jha ............ G06F 3/017 345/173 |
| 2009/0228842 A1 | 9/2009 | Westerman |
| 2009/0243967 A1 | 10/2009 | Kato |
| 2010/0235726 A1 | 9/2010 | Ording et al. |
| 2011/0187640 A1 | 8/2011 | Jacobsen et al. |
| 2012/0035934 A1 | 2/2012 | Cunningham |
| 2012/0127082 A1 | 5/2012 | Kushler |
| 2012/0236025 A1* | 9/2012 | Jacobsen ......... G06F 3/011 345/629 |
| 2013/0006957 A1 | 1/2013 | Huang |
| 2013/0033649 A1* | 2/2013 | Kim ............ G06F 3/017 348/734 |
| 2013/0141360 A1 | 6/2013 | Compton et al. |
| 2013/0147836 A1 | 6/2013 | Small |
| 2013/0169532 A1 | 7/2013 | Zahnke |
| 2013/0271360 A1 | 10/2013 | MacDougall et al. |
| 2013/0288753 A1* | 10/2013 | Jacobsen ......... G06F 3/167 455/563 |
| 2013/0300661 A1 | 11/2013 | Ezra |
| 2014/0049463 A1* | 2/2014 | Seo ............ G06F 3/0487 345/156 |
| 2014/0195918 A1 | 7/2014 | Friedlander |
| 2014/0358536 A1 | 12/2014 | Choi |
| 2015/0138073 A1 | 5/2015 | Hennelly |
| 2015/0138074 A1 | 5/2015 | Hennelly et al. |
| 2015/0138084 A1 | 5/2015 | Hennelly et al. |
| 2015/0227209 A1 | 8/2015 | Nicholson |
| 2015/0331492 A1 | 11/2015 | Woo |
| 2018/0210544 A1 | 7/2018 | Hennelly |

FOREIGN PATENT DOCUMENTS

| | | |
|---|---|---|
| WO | WO 2015/073874 | 5/2015 |
| WO | WO 2015/073879 | 5/2015 |
| WO | WO 2015/073880 | 5/2015 |

OTHER PUBLICATIONS

International Search Report and Written Opinion of PCT/US2014/065787 entitled "Head Tracking Based Gesture Control Techniques for Head Mounted Displays" dated Feb. 9, 2015.

International Search Report and Written Opinion of PCT/US2014/065778 dated Mar. 4, 2015 entitled "Text Selection Using HMD Head-Tracker and Voice-Command".

International Search Report and Written Opinion for PCT/US2014/065788 dated Feb. 26, 2015 entitled "Head-Tracking Based Selection Technique for Head Mounted Displays (HMD)".

International Preliminary Report on Patentability for PCT/US2014/065778 dated May 26, 2016.

International Preliminary Report on Patentability for PCT/US2014/065787 dated May 26, 2016.

International Preliminary Report on Patentability for PCT/US2014/065788 dated May 26, 2016.

* cited by examiner

AUTOMATIC SPEECH RECOGNITION (ASR) FEEDBACK FOR HEAD MOUNTED DISPLAYS (HMD)

RELATED APPLICATIONS

This application claims the benefit of U.S. Provisional Application No. 61/905,130, filed on Nov. 15, 2013.

This application is related to the following U.S. patent applications:

U.S. patent application Ser. No. 14/540,905, filed Nov. 13, 2014, entitled "Text Selection Using HMD Head-tracker and Voice-Command."

U.S. patent application Ser. No. 14/540,939, filed Nov. 13, 2014, entitled "Head-Tracking Based Selection Technique For Head Mounted Displays (HMD)."

U.S. patent application Ser. No. 14/540,974, filed Nov. 13, 2014, entitled "Head Tracking Based Gesture Control Techniques For Head Mounted Displays."

The entire teachings of the above applications are incorporated herein by reference.

BACKGROUND OF THE INVENTION

Mobile computing devices, such as a laptop or notebook PC, a smart phone, and tablet computing device, are now common tools used for producing, analyzing, communicating, and consuming data in both business and personal life. Consumers continue to embrace a mobile digital lifestyle as the ease of access to digital information increases with high speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free, high quality, portable, color display solution to augment or replace their hands-dependent mobile devices.

SUMMARY OF THE INVENTION

Recently developed micro-displays can provide large-format, high-resolution color pictures and streaming video in a very small form factor. One application for such displays can be integrated into a wireless headset computer worn on the head of the user with a display within the field of view of the user, similar in format to eyeglasses, audio headset or video eyewear.

A "wireless computing headset" device, also referred to herein as a headset computer (HSC) or head mounted display (HMD), includes one or more small, high resolution micro-displays and associated optics to magnify the image. The high resolution micro-displays can provide super video graphics array (SVGA) (800×600) resolution or extended graphic arrays (XGA) (1024×768) resolution, or higher resolutions known in the art.

A wireless computing headset contains one or more wireless computing and communication interfaces, enabling data and streaming video capability, and provides greater convenience and mobility through hands dependent devices.

For more information concerning such devices, see co-pending patent applications entitled "Mobile Wireless Display Software Platform for Controlling Other Systems and Devices," U.S. application Ser. No. 12/348,648 filed Jan. 5, 2009, "Handheld Wireless Display Devices Having High Resolution Display Suitable For Use as a Mobile Internet Device," PCT International Application No. PCT/US09/38601 filed Mar. 27, 2009, and "Improved Headset Computer," U.S. Application No. 61/638,419 filed Apr. 25, 2012, each of which are incorporated herein by reference in their entirety.

The present invention relates to use of a Head-Mounted Display (HMD). The HMD is controlled partially by voice-command. The HMD receives speech input from the user, and attempts to recognize the received speech, through various processing techniques, as one of a suite of known voice commands. It is very important for the HMD to provide feedback to the user when received speech is recognized as a speech command, as soon as possible after the spoken command. Doing so helps to deliver a pleasant and efficient experience for the user.

Embodiments provide feedback mechanisms to the user of a HMD, to ensure that the user feels confident that the unit has understood the spoken commands.

In one aspect, the invention is a method of acknowledging a voice command. The method includes receiving, by a headset computer, a voice command. The method further includes interpreting the voice command and in response to interpreting the voice command, acknowledging the received voice command.

One embodiment further includes converting an utterance, which corresponds to the voice command, into an electrical signal. One way of converting the utterance is using a microphone, although other techniques for converting sound into an electrical signal may also be used.

In another embodiment, interpreting the voice command further includes determining if the voice command is a member of a predetermined suite of voice commands.

In one embodiment, acknowledging the received voice command includes presenting an automatic speech recognition (ASR) notification clue. The ASR notification clue may include a visual clue. The visual clue may be presented within 500 mS of when the utterance is interpreted, although other periods of time between interpretation of the utterance and presenting the visual clue may be used. The visual clue may be instantiated on a display within two cycles of the frame rate of the display. In another embodiment, the visual clue remains on the display for a predetermined time after the visual clue is instantiated, and removed from the display after the predetermined time has elapsed.

In some embodiments, the ASR notification clue may include an audio clue, alone or in combination with the visual clue. In one embodiment the audio clue may be a chirp, although other sounds may alternatively be used to indicate recognition of an utterance.

In another aspect, the invention is apparatus for acknowledging a voice command. The apparatus includes a headset computer configured to receive a voice command, interpret the voice command, and acknowledge the received voice command in response to interpreting the voice command.

In one embodiment, the apparatus is further configured to convert, using a microphone, an utterance corresponding to the voice command into an electrical signal.

In another embodiment, the headset computer is further configured to determine if the voice command is a member of a predetermined suite of voice commands.

In another embodiment, the headset computer is further configured to present an automatic speech recognition (ASR) notification clue. The ASR notification clue may include a visual clue. The visual clue may be presented within 500 mS of when the utterance is interpreted. The visual clue may be instantiated on a display within two cycles of the frame rate of the display. The visual clue may remain on the display for a predetermined time after the visual clue is instantiated, and be removed from the display after the predetermined time has elapsed.

In one embodiment, the ASR notification clue includes an audio clue. The audio clue may be a chirp.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1A:
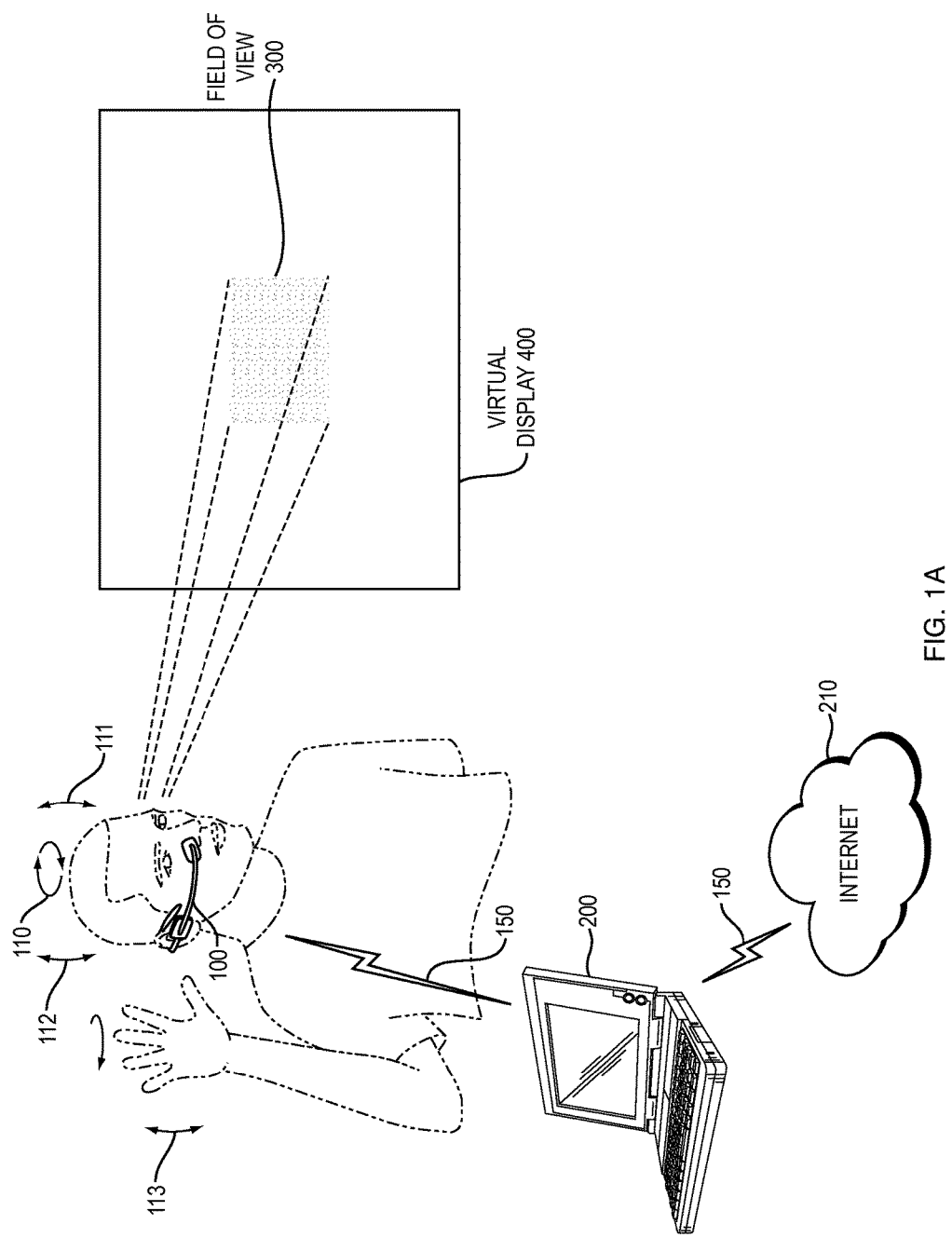
FIGS. 1A-1B are schematic illustrations of a headset computer cooperating with a host computer (e.g., Smart Phone, laptop, etc.) according to principles of the present invention.
Figure 1B:
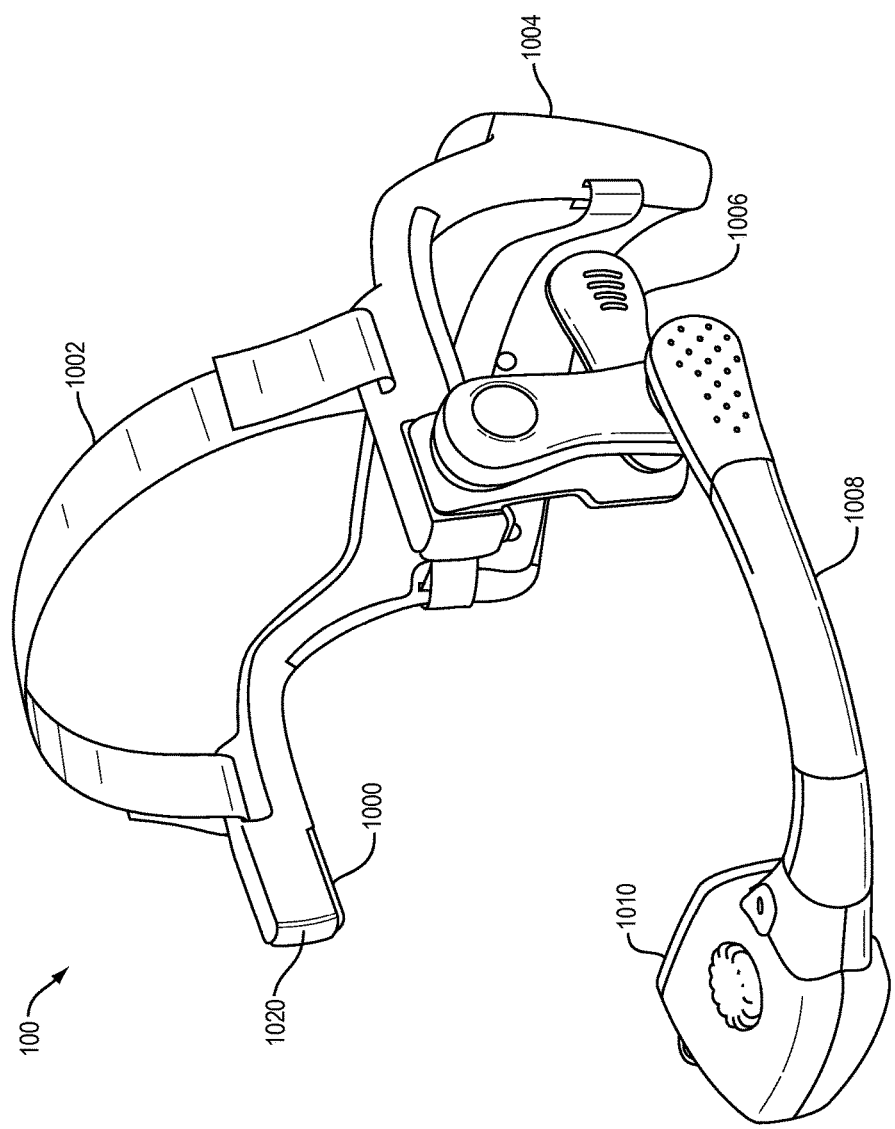

FIGS. 1A and 1B show an example embodiment of a wireless computing headset device 100 (also referred to herein as a headset computer (HSC) or head mounted display (HMD)) that incorporates a high-resolution (VGA or better) micro-display element 1010, and other features described below.

HSC 100 can include audio input and/or output devices, including one or more microphones, input and output speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports 1020 (FIG. 1B).

Typically located within the housing of headset computing device 100 are various electronic circuits including, a microcomputer (single or multicore processors), one or more wired and/or wireless communications interfaces, memory or storage devices, various sensors and a peripheral mount or mount, such as a "hot shoe."

Example embodiments of the HSC 100 can receive user input through sensing voice commands, head movements, 110, 111, 112 and hand gestures 113, or any combination thereof. A microphone (or microphones) operatively coupled to or integrated into the HSC 100 can be used to capture speech commands, which are then digitized and processed using automatic speech recognition techniques. Gyroscopes, accelerometers, and other micro-electromechanical system sensors can be integrated into the HSC 100 and used to track the user's head movements 110, 111, 112 to provide user input commands. Cameras or motion tracking sensors can be used to monitor a user's hand gestures 113 for user input commands. Such a user interface may overcome the disadvantages of hands-dependent formats inherent in other mobile devices.

The HSC 100 can be used in various ways. It can be used as a peripheral display for displaying video signals received and processed by a remote host computing device 200 (shown in FIG. 1A). The host 200 may be, for example, a notebook PC, smart phone, tablet device, or other computing device having less or greater computational complexity than the wireless computing headset device 100, such as cloud-based network resources. The headset computing device 100 and host 200 can wirelessly communicate via one or more wireless protocols, such as Bluetooth®, Wi-Fi, WiMAX, 4G LTE or other wireless radio link 150. (Bluetooth is a registered trademark of Bluetooth Sig, Inc. of 5209 Lake Washington Boulevard, Kirkland, Wash. 98033).

In an example embodiment, the host 200 may be further connected to other networks, such as through a wireless connection to the Internet or other cloud-based network resources, so that the host 200 can act as a wireless relay between the HSC 100 and the network 210. Alternatively, some embodiments of the HSC 100 can establish a wireless connection to the Internet (or other cloud-based network resources) directly, without the use of a host wireless relay. In such embodiments, components of the HSC 100 and the host 200 may be combined into a single device.

FIG. 1B is a perspective view showing some details of an example embodiment of a headset computer 100. The example embodiment HSC 100 generally includes, a frame 1000, strap 1002, rear housing 1004, speaker 1006, cantilever, or alternatively referred to as an arm or boom 1008 with a built in microphone, and a micro-display subassembly 1010.

A head worn frame 1000 and strap 1002 are generally configured so that a user can wear the headset computer device 100 on the user's head. A housing 1004 is generally a low profile unit which houses the electronics, such as the microprocessor, memory or other storage device, along with other associated circuitry. Speakers 1006 provide audio output to the user so that the user can hear information. Micro-display subassembly 1010 is used to render visual information to the user. It is coupled to the arm 1008. The arm 1008 generally provides physical support such that the micro-display subassembly is able to be positioned within the user's field of view 300 (FIG. 1A), preferably in front of the eye of the user or within its peripheral vision preferably slightly below or above the eye. Arm 1008 also provides the electrical or optical connections between the micro-display subassembly 1010 and the control circuitry housed within housing unit 1004.

According to aspects that will be explained in more detail below, the HSC display device 100 allows a user to select a field of view 300 within a much larger area defined by a virtual display 400. The user can typically control the position, extent (e.g., X-Y or 3D range), and/or magnification of the field of view 300.

While what is shown in FIGS. 1A and 1B is a monocular micro-display presenting a single fixed display element supported on the face of the user with a cantilevered boom, it should be understood that other mechanical configurations for the remote control display device 100 are possible, such as a binocular display with two separate micro-displays (e.g., one for each eye) or a single micro-display arranged to be viewable by both eyes.

Figure 2:
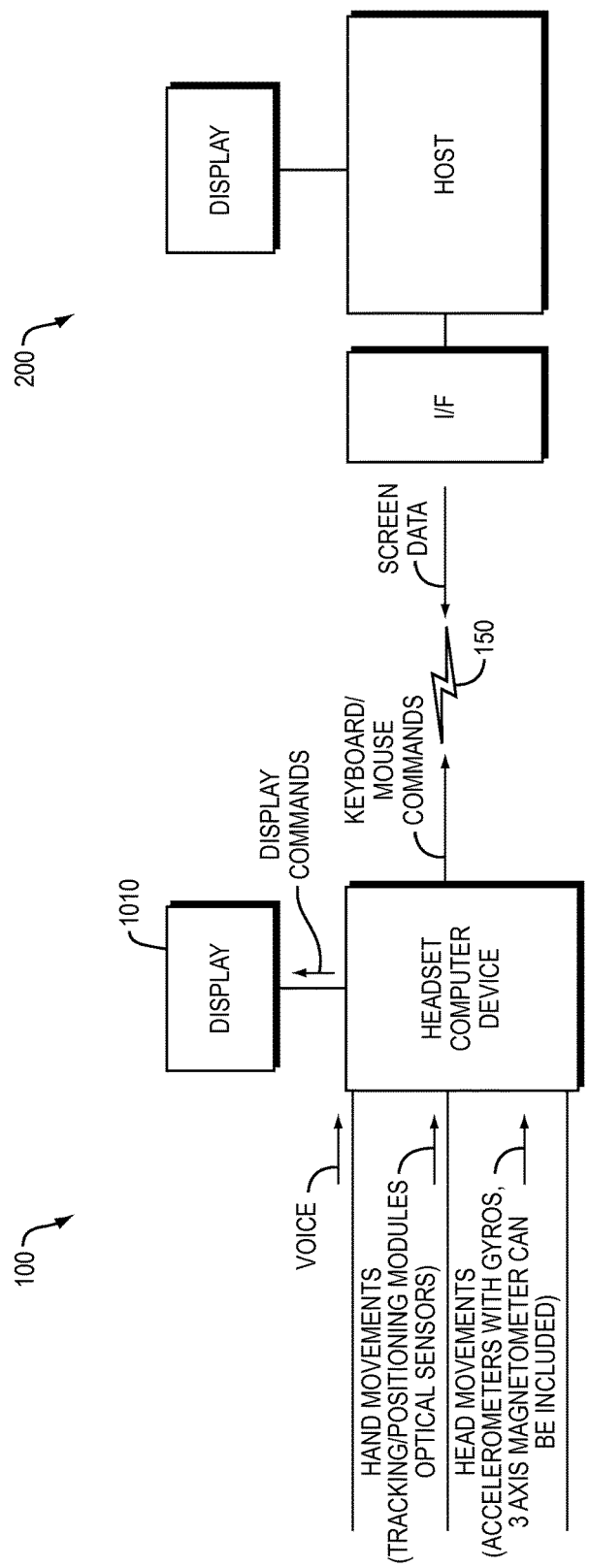
FIG. 2 is a block diagram of flow of data and control in the embodiment of FIGS. 1A-1B.

FIG. 2 is a block diagram showing more detail of an embodiment of the HSC or HMD device 100, host 200 and the data that travels between them. The HSC or HMD device 100 receives vocal input from the user via the microphone, hand movements or body gestures via positional and orientation sensors, the camera or optical sensor(s), and head movement inputs via the head tracking circuitry such as 3 axis to 9 axis degrees of freedom orientational sensing. These are translated by software (processors) in the HSC or HMD device 100 into keyboard and/or mouse commands that are then sent over the Bluetooth or other wireless interface 150 to the host 200. The host 200 then interprets these translated commands in accordance with its own operating system/application software to perform various functions. Among the commands is one to select a field of view 300 within the virtual display 400 and return that selected screen data to the HSC or HMD device 100. Thus, it should be understood that a very large format virtual display area might be associated with application software or an operating system running on the host 200. However, only a portion of that large virtual display area 400 within the field of view 300 is returned to and actually displayed by the micro display 1010 of HSC or HMD device 100.

In one embodiment, the HSC 100 may take the form of the device described in a co-pending US Patent Publication Number 2011/0187640, which is hereby incorporated by reference in its entirety.

The present invention relates to use of an HMD 100 that is capable of being controlled by voice-command. The HMD 100 receives speech input from the user, and attempts to recognize the received speech as one of a predetermined suite of known voice commands.

It is very important for the HMD 100 to provide feedback to the user when received speech is recognized as a speech command, as soon as possible after the spoken command. Doing so helps to deliver a pleasant and efficient experience for the user.

The typical Automatic Speech recognition (ASR) system is set up to wait for a predetermined period of time once a speech utterance ceases (i.e., a pause in speech, for example 200 mS) before the system assumes that the user has completed the command. So at a bare minimum there will always be a gap (e.g., 200 mS) after speaking before the ASR subsystem will provide acknowledgment feedback to the user.

Embodiments of the present invention may provide feedback to the user in visual form, audible form, a command spoken back to the user, or any combination thereof.

Visual Feedback

One way to notify a user that a command was received, and correctly interpreted, is by providing a visual clue, i.e., a clue that can be seen by the user. When a user utters one of a predetermined set of voice commands, the HMD 100 processes the received sound and evaluates the processed information against a set of known voice commands, to generate a proposed interpretation of the sound input.

Figure 4:
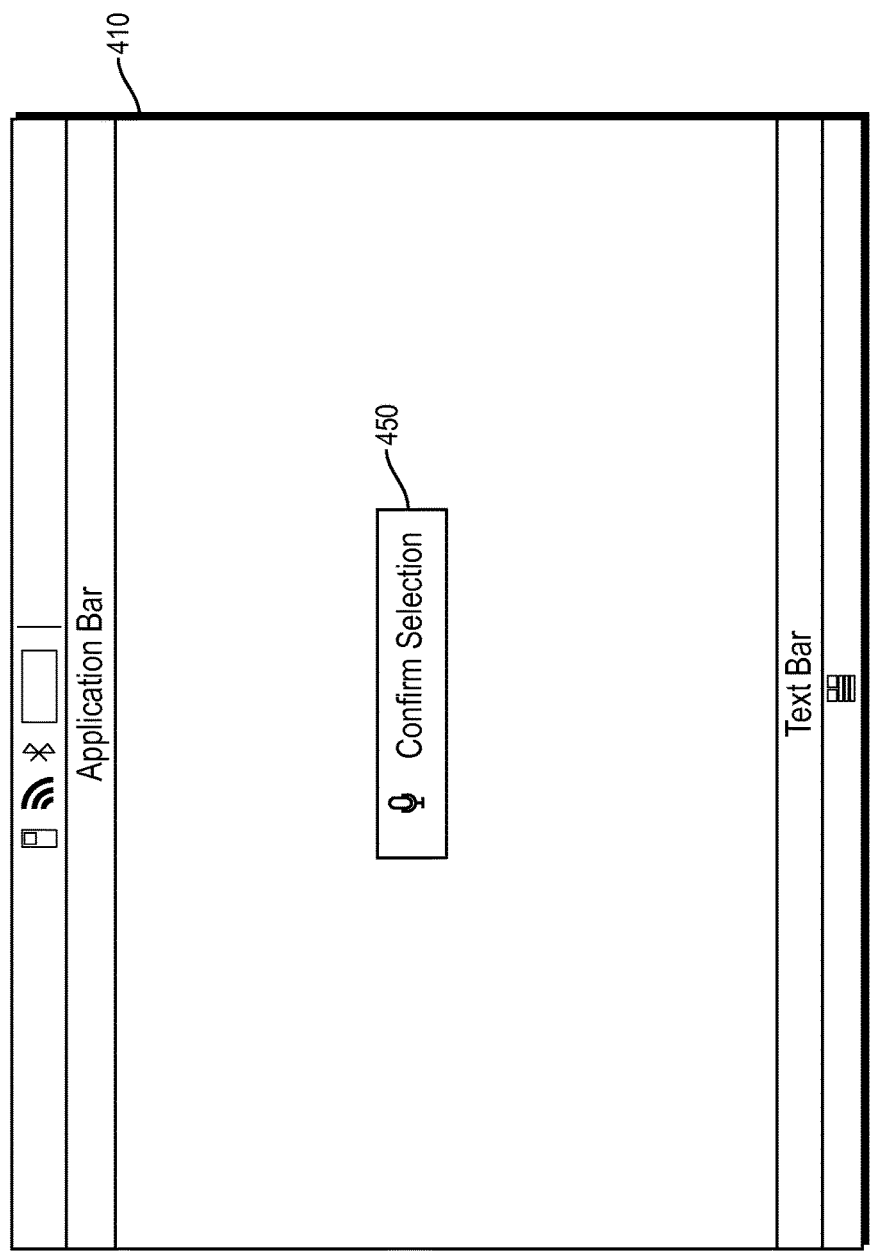
FIG. 4 is a schematic illustration of graphical user interface (GUI) employed in embodiments.

In accordance with principles of the present invention, the HMD 100 may display, on screen 1010, an alert (for example, a pop-up message or other type of notification) for the user, indicating the voice command that the HMD 100 has interpreted. This notification 450 is referred herein to as an ASR (automatic speech recognition) acknowledgement, as shown by the example depicted in FIG. 4. In this example, the user may have previously made a selection, perhaps choice "c" from a multiple choice array of "a, b, c or d." In order to confirm the choice of "c," the user enunciates "confirm selection." Thus, as shown in the example of FIG. 4, the HMD 100 presents the "confirm selection" notification 450 to the user.

Empirical data suggests that a user 'responds' better to a visual notification presented first with respect to an audio clue. Humans may perceive a visual, onscreen alert more quickly than a counterpart audible alert. Based on this assumption, the at least one of the described embodiments seeks to display the ASR acknowledgment 450 as soon as possible.

Example embodiments 100 may instantiate the alert within 500 mS (0.5 seconds) of the user voice command being uttered, which may give the system 100 crisply responsive feel, with respect to the ASR. Providing such a timely prompt, indicating that the utterance was received and correctly recognized, may lead to a satisfying experience for the user.

The system 100 seems more responsive if the ASR acknowledgment 450 just 'pops' up rapidly. A slow fade-in visual effect may add unnecessary time to the notification and consequently make the system 100 seem lethargic. A fast fade is generally too fast to really be noticed, and so does not provide any benefit. In an example embodiment, the ASR acknowledgement is completely instantiated within two cycles of the microdisplay's frame rate, although in other embodiments the ASR acknowledgement may be instantiated more quickly or less quickly.

One or more embodiments of the system 100 may leave the ASR acknowledgment 450 displayed/illuminated on the screen (display 1010) for a predetermined period of time to allow an application executing on the system 100 time to respond. An example amount of time to leave the ASR acknowledgement on the screen may be 1 to 3 seconds, although shorter or longer times may also be used. After the predetermined amount of time has elapsed, the ASR acknowledgement is removed from the display.

Other embodiments of the system 100 may leave this ASR acknowledgment 450 on the screen of display 1010 until the subject application has finished its current task, regardless of how long it takes to finish. The disappearance of the ASR acknowledgement 450 may be the visual clue that indicates to the user that it is permissible to speak (i.e., utter) the next voice command.

Example guidelines for visual design of the foregoing ASR acknowledgment 450 may include one or more of: (a) place the ASR acknowledgment in a layer in front of all other content within the screen/display 1010; (b) center on screen both vertically and horizontally; (c) preferably run text on only one line (i.e., do not wrap text); (d) keep the height of the box that contains the ASR acknowledgment at a fixed size; and (e) allow the width to vary, depending on length of ASR command feedback.

Audible Feedback

Another way to notify a user that a command was received and correctly interpreted is by providing a clue that can be heard. In one embodiment, an example audio output counterpart to the visual ASR acknowledgement 450 described above may be described as an audible "chirp." A chirp may consist of a single, short burst of sound. The chirp may have a constant frequency, or it may have a frequency that varies as a function of time.

The audio notification may be conveyed to the user by itself, or in conjunction with the visual notification. In an embodiment having a combined visual and audio notification, the audio clue may follow the visual clue. In this case, once the visual clue 450 is instantiated on the display screen 1010, the audio (via speaker 9006, FIG. 3) can lag by an additional amount of time (e.g., 500 mS) without a significant effect to the user experience.

The audio chirp may be user configurable, in that the user can choose, for example, to turn the chirp on or off, vary the volume of the chirp, vary the duration of the chirp or modify the frequency characteristics of the chirp.

Command Spoken Back to User

In alternative audible feedback format (a counterpart to the ASR acknowledgement 450 described herein), the device 100 "speaks back" to the user (using a text-to-speech facility) the command it has interpreted as having been issued (uttered) by the user.

In the illustrated example, the HMD unit 100 confirms to the user that the spoken command was correctly received by enunciating (via speaker 9006) the command 'Confirm Selection' back to the user. The spoken command acknowledgement is user configurable in that the user can, for example, choose to turn it on or off, adjust the volume, change the voice characteristics of the enunciation (e.g., male or female voice, language, etc).

In one embodiment, the user can have either the audible chirp or the text to speech feedback mechanism, or both, for ASR acknowledgement 450. Although since both are audio clues, embodiments generally do not have both working (rendering) at the same time.

The system 100 works by using 'Text-To-Speech' software 9035*b* to audibly read the phrase recognized (as one of the phrases that the system 100 is 'listening for').

In this way, embodiments of the present invention ensure the user feels confident that the HMD unit 100 has understood their spoken voice commands.

In one embodiment the HSC 100 may take the form of the HSC described in a co-pending US Patent Publication Number 2011/0187640 which is hereby incorporated by reference in its entirety.

In another embodiment, the invention relates to the concept of using a Head Mounted Display (HMD) 1010 in conjunction with an external 'smart' device 200, (such as a smartphone or tablet) to provide information and control to the user hands-free. The invention requires transmission of small amounts of data, providing a more reliable data transfer method running in real-time.

In this sense therefore, the amount of data to be transmitted over the connection 150 is small—simply instructions on how to lay out a screen, which text to display, and other stylistic information such as drawing arrows, or the background colors, images to include, etc.

Additional data could be streamed over the same 150 or another connection and displayed on screen 1010, such as a video stream if required by the host 200.

Figure 3:
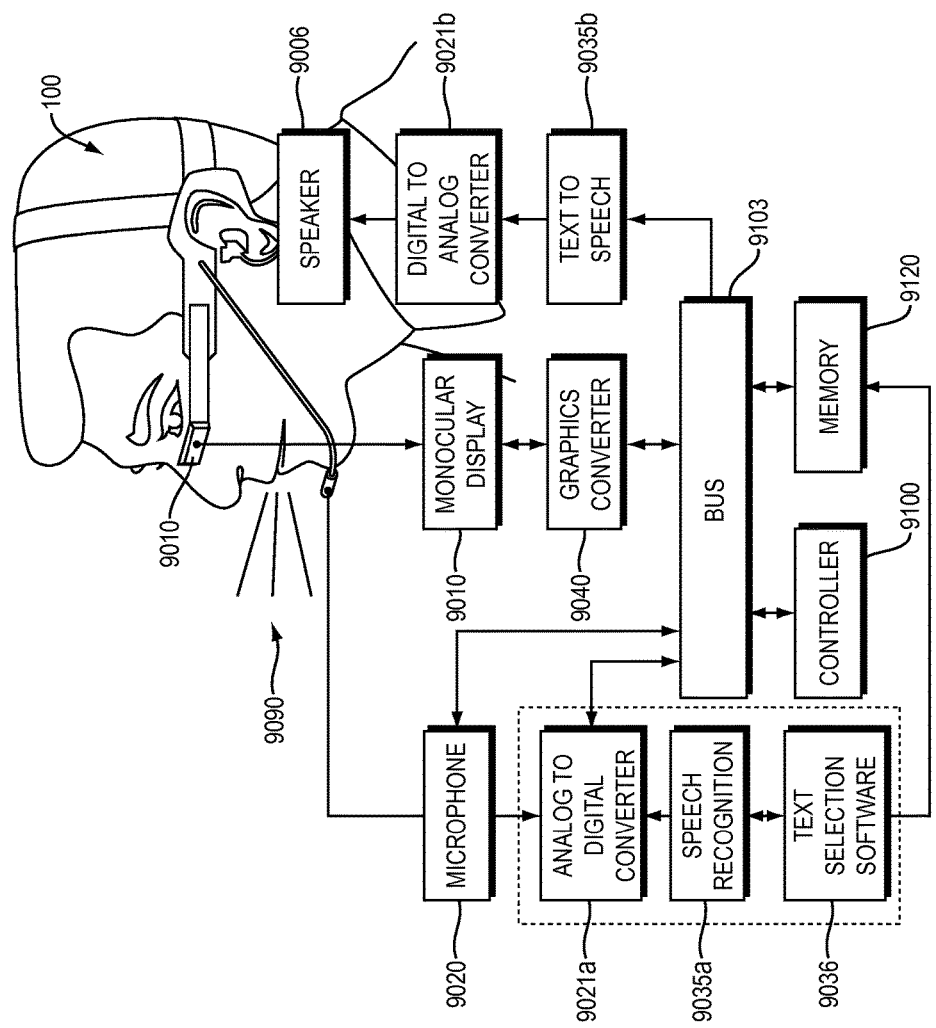
FIG. 3 is a block diagram of automatic speech recognition (ASR) subsystem in embodiments.

FIG. 3 shows an exemplary non-limiting wireless hands-free video computing headset 100 under voice command. The user can be presented with an image on the microdisplay 9010, for example, as output by host computer 200 described above. A user of the HMD 100 can use visual and/or audible ASR acknowledgement software module 9036, either locally or from a remote host 200, in which the user is presented with visual and/or audible ASR acknowledgement on the microdisplay 9010 and through the speaker 9006 of the headset computer 100. Because the headset computer 100 is also equipped with a microphone 9020, the user can utter voice commands (i.e., make command selections) as illustrated with respect to one or more embodiments of present invention.

FIG. 3 shows a schematic diagram illustrating the modules of the headset computer 100. FIG. 3 includes a schematic diagram of the operative modules of the headset computer 100. For the case of ASR acknowledgement in speech driven applications controller 9100 accesses ASR acknowledgement module 9036, which can be located locally to each HMD 100 or located remotely at a host 200 (FIGS. 1A-1B). ASR acknowledgement software module 9036 contains instructions to display to a user a screen view 410 of a pertinent message box or the like (examples are detailed in FIG. 4). The graphics converter module 9040 converts the image instructions received from the ASR acknowledgement module 9036 via bus 9103 and converts the instructions into graphics to display on the monocular display 9010. At the same time text-to-speech module 9035*b* converts instructions received from ASR acknowledgement software module 9036 to create sounds representing the contents for the screen view 410 to be displayed. The instructions are converted into digital sounds representing the corresponding image contents that the text-to-speech module 9035*b* feeds to the digital-to-analog converter 9021*b*, which in turn feeds speaker 9006 to present the audio to the user. ASR acknowledgement software module 9036 can be stored locally at memory 9120 or remotely at a host 200 (FIGS. 1A-1B). The user can speak/utter the command selection from a screen view 410 and the user's speech 9090 is received at microphone 9020. The received speech is then converted from an analog signal into a digital signal at analog-to-digital converter 9021*a*. Once the speech is converted from an analog to a digital signal speech recognition module 9035*a* processes the speech into recognized speech. The recognized speech is compared against known speech, and the ASR acknowledgement module 9036 responds according to the instructions as described above.

Figure 5:
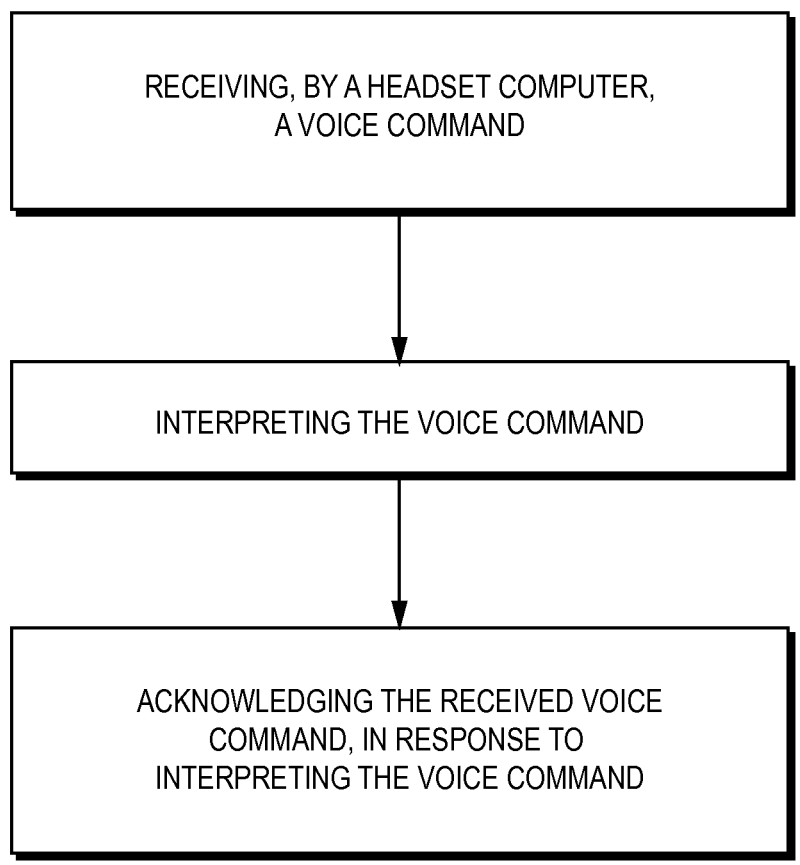
FIG. 5 is a flow diagram according to one embodiment of the invention.

FIG. 5 is a flow diagram according to one of the described embodiments.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A method of utilizing a user input from a user, comprising:
   receiving, by a headset computer, the user input comprising a combination of one or more of (i) a voice command and a head movement and (ii) a voice command and a hand gesture;
   interpreting the head movement to generate an interpreted head movement command;
   interpreting the hand gesture to generate an interpreted hand gesture;
   interpreting the voice command using an automatic speech recognition system to generate an interpreted voice command, and providing visual feedback to the user on a display such that the visual feedback is presented to the user one of (a) within 500mS of when the voice command is interpreted and (b) within two cycles of a frame rate of the display of when the voice command is interpreted; and
   combining the interpreted voice command and at least one of the interpreted head movement command and the interpreted hand gesture command to generate a host command.

2. The method of claim 1, further including converting, using a microphone, an utterance corresponding to the voice command into an electrical signal.

3. The method of claim 1, wherein interpreting the voice command includes determining if the voice command is a member of a predetermined suite of voice commands.

4. The method of claim 1, wherein acknowledging the received voice command includes presenting an automatic speech recognition (ASR) notification clue.

5. The method of claim 4, wherein the ASR notification clue includes a visual clue.

6. The method of claim 5, wherein the visual clue remains on the display for a predetermined time after the visual clue is instantiated, and removed from the display after the predetermined time has elapsed.

7. The method of claim 4, wherein the ASR notification clue includes an audio clue.

8. The method of claim 7, wherein the audio clue is a chirp.

9. An apparatus for utilizing a user input from a user, comprising:
   a headset computer, including a processor, configured to:
   receive the user input comprising a combination of one or more of (i) a voice command and a head movement and (ii) a voice command and a hand gesture;
   interpret the head movement to generate an interpreted head movement command;
   interpret the hand gesture to generate an interpreted hand gesture;
   interpreting the voice command using an automatic speech recognition system to generate an interpreted voice command, and providing visual feedback to the user on a display such that the visual feedback is presented to the user one of (a) within 500mS of when the voice command is interpreted and (b) within two cycles of a frame rate of the display of when the voice command is interpreted; and
   combine the interpreted voice command and at least one of the interpreted head movement command and the interpreted hand gesture command to generate a host command.

10. The apparatus of claim 9, wherein the headset computer is further configured to convert, using a microphone, an utterance corresponding to the voice command into an electrical signal.

11. The apparatus of claim 9, wherein the headset computer is further configured to determine if the voice command is a member of a predetermined suite of voice commands.

12. The apparatus of claim 9, the headset computer is further configured to present an automatic speech recognition (ASR) notification clue.

13. The apparatus of claim 12, wherein the ASR notification clue includes a visual clue.

14. The apparatus of claim 13, wherein the visual clue remains on the display for a predetermined time after the visual clue is instantiated, and removed from the display after the predetermined time has elapsed.

15. The apparatus of claim 12, wherein the ASR notification clue includes an audio clue.

16. The apparatus of claim 15, wherein the audio clue is a chirp.

* * * * *